United States Patent
Pace, Jr. et al.

(10) Patent No.: US 11,588,762 B1
(45) Date of Patent: *Feb. 21, 2023

(54) SIMULATION-BASED VIRTUAL ADVISOR

(71) Applicant: United Services Automobile Association (USAA), San Antonio, TX (US)

(72) Inventors: Robert B. Pace, Jr., San Antonio, TX (US); Jerome J. Gainer, Jr., Helotes, TX (US); Bipin Chadha, Phoenix, AZ (US); Samuel E. Tumlinson, San Antonio, TX (US); Jose Esteban Deleon, III, Jourdanton, TX (US); Brett Andrew Walker, Irving, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,667

(22) Filed: Nov. 19, 2021

Related U.S. Application Data

(63) Continuation of application No. 16/019,290, filed on Jun. 26, 2018, now Pat. No. 11,212,241.

(Continued)

(51) Int. Cl.
*H04L 51/02* (2022.01)
*H04L 51/04* (2022.01)
(Continued)

(52) U.S. Cl.
CPC .......... *H04L 51/02* (2013.01); *G06F 16/3329* (2019.01); *G06F 40/40* (2020.01);
(Continued)

(58) Field of Classification Search
CPC ..... G06F 16/3329; G06F 17/28; G06Q 40/02; H04L 51/04; H04W 4/14
See application file for complete search history.

(56) References Cited

U.S. PATENT DOCUMENTS 8,301,501 B1 * 10/2012 Glaeser .................. G06Q 40/02
705/17
8,756,112 B1 * 6/2014 Edelman ............ G06Q 30/0621
705/26.4

(Continued)

OTHER PUBLICATIONS

OCBC, "OCBC Bank Launches First Artificial Intelligence-Powered Home & Renovation Loan Specialist", Apr. 5, 2017, OCBC Bank, "https://www.ocbc.com/group/media/release/2017/home-and-renovation-loan-specialist-ai-emma" (Year: 2017).*

(Continued)

*Primary Examiner* — Dhairya A Patel
*Assistant Examiner* — Eui H Kim
(74) *Attorney, Agent, or Firm* — Perkins Coie LLP

(57) ABSTRACT

Various embodiments of the present disclosure relate generally to providing virtual assistants. More specifically, various embodiments of the present disclosure relate to methods and systems for providing a simulation-based virtual advisor. In some embodiments, the systems and methods combine and/or integrate the functionality of a conversational virtual agent (e.g., a virtual assistant) with the functionality of a simulation virtual agent, to provide users, customers, or members with targeted, user-specific information in response to questions or other intentions posed by the users via messages exchanged between the users and the agents.

14 Claims, 10 Drawing Sheets

Related U.S. Application Data

(60) Provisional application No. 62/526,947, filed on Jun. 29, 2017.

(51) Int. Cl.
*G06Q 40/02* (2012.01)
*H04W 4/14* (2009.01)
*G06F 40/40* (2020.01)
*G06F 16/332* (2019.01)

(52) U.S. Cl.
CPC .............. *G06Q 40/02* (2013.01); *H04L 51/04* (2013.01); *H04W 4/14* (2013.01)

(56) References Cited

U.S. PATENT DOCUMENTS

| | | | | |
|---|---|---|---|---|
| 8,843,405 | B1* | 9/2014 | Hartman | G06Q 40/02 705/30 |
| 2009/0037323 | A1* | 2/2009 | Feinstein | G06Q 40/00 705/38 |
| 2011/0040581 | A1* | 2/2011 | Wirth | G06Q 40/08 705/36 R |
| 2014/0067460 | A1 | 3/2014 | Atacik et al. | |
| 2014/0114735 | A1* | 4/2014 | Isaacson | G06Q 20/42 705/26.7 |
| 2016/0035039 | A1 | 2/2016 | Singh et al. | |
| 2016/0253674 | A1* | 9/2016 | Blainey | G06F 17/18 705/35 |
| 2016/0267596 | A1* | 9/2016 | Johansen | G06Q 40/06 |
| 2017/0250930 | A1* | 8/2017 | Ben-Itzhak | G06F 3/0488 |
| 2017/0323345 | A1* | 11/2017 | Flowers | G06Q 30/0269 |
| 2018/0025726 | A1* | 1/2018 | Gatti de Bayser | G10L 15/22 704/257 |
| 2018/0052664 | A1* | 2/2018 | Zhang | G06N 5/04 |
| 2018/0181558 | A1* | 6/2018 | Emery | H04L 51/02 |
| 2018/0255006 | A1* | 9/2018 | Kamat | H04L 51/02 |

OTHER PUBLICATIONS

"OCBC Bank Launches First Artificial Intelligence-Powered Home & Renovation Loan Specialist," EMMA, Apr. 5, 2017, OCBC Bank, https://www.ocbc.com/group/media/release/2017/home-and-renovation-loan-specialist-ai-emma , 5 pages.

U.S. Appl. No. 16/019,290, filed Jun. 26, 2018, Simulation-Based Virtual Advisor.

U.S. Appl. No. 62/526,947, filed Jun. 29, 2017, Systems and Methods for Providing a Simulation-Based Virtual Advisor.

\* cited by examiner

SIMULATION-BASED VIRTUAL ADVISOR

CROSS-REFERENCE TO RELATED APPLICATIONS

This application is a continuation of U.S. patent application Ser. No. 16/019,290, filed Jun. 26, 2018, now allowed, which is a non-provisional of and claims priority to U.S. Provisional Application No. 62/526,947 filed Jun. 29, 2017, entitled "SYSTEMS AND METHODS FOR PROVIDING A SIMULATION-BASED VIRTUAL ADVISOR," both of which are hereby incorporated by reference in their entirety for all purposes.

TECHNICAL FIELD

Various embodiments of the present disclosure relate generally to providing virtual assistants. More specifically, various embodiments of the present disclosure relate to methods and systems for providing a simulation-based virtual advisor.

BACKGROUND

Virtual assistants, such as chatbots and other automated applications, communicate with users in a variety of ways. For example, they provide answers to common or typical customer service inquiries (e.g., "How can I see my account balance?"), they provide users with static or stored information (e.g., "How much is in my account?"), and so on. However, virtual assistants, in general, are configured to provide answers to many different users having similar, or previously asked, questions to the virtual assistants, and, thus, suffer from various drawbacks associated with providing realistic, casual, and/or valuable experiences with users, such as customers or members of entities providing the virtual assistants.

BRIEF DESCRIPTION OF THE DRAWINGS

Embodiments of the present disclosure will be described and explained through the use of the accompanying drawings in which.

DETAILED DESCRIPTION

Overview

Figure 1:
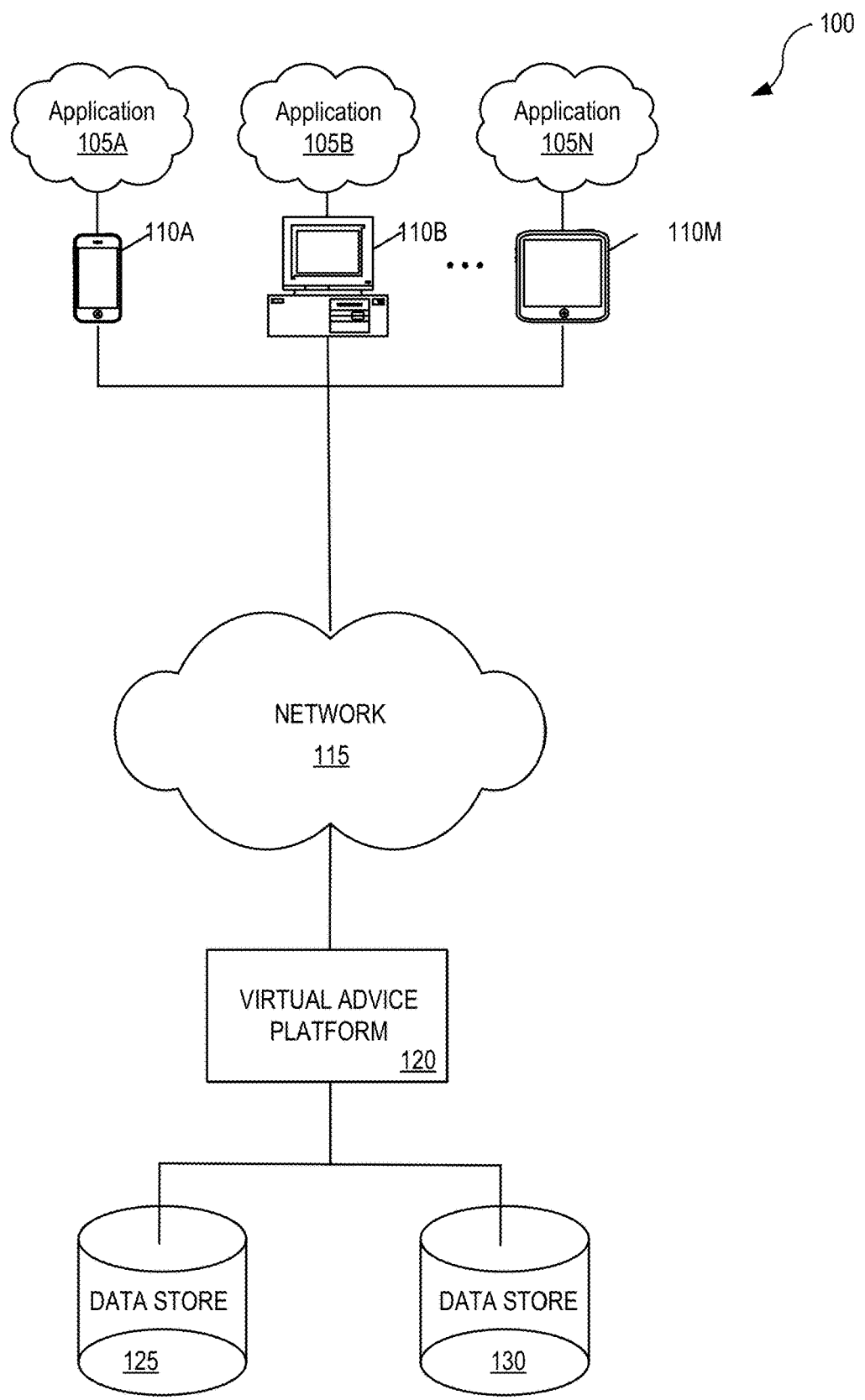
FIG. 1 illustrates an example of a network-based operating environment in accordance with various embodiments of the present disclosure.

Various embodiments of the present disclosure relate generally to providing virtual assistants. More specifically, various embodiments of the present disclosure relate to methods and systems for providing a simulation-based virtual advisor. In some embodiments, the systems and methods combine and/or integrate the functionality of a conversational virtual agent (e.g., a chatbot or virtual assistant) with the functionality of a simulation virtual agent, to provide users, customers, or members with targeted, user-specific information in response to questions or other intentions posed by the users via messages exchanged between the users and the agents.

Thus, in some embodiments, the systems and methods described herein facilitate providing advice, such as financial advice or other user requested guidance, to users via virtual assistants. For example, a financial services entity, such as a bank, insurance company, financial management company, personal budgeting or online information tool, and so on, may utilize such systems and methods in order to provide their customers or members with predictions for how their future financial statuses (e.g., net worth, overall savings, and so on) may change in response to current or proposed actions or financial events (e.g., buying a car, refinancing a house, changing a 401(k) withholding, increasing insurance coverage, and so on).

The systems and methods, therefore, utilize virtual agents that facilitate providing users with near real-time (or, real-time) advice or recommendations in response to their queries or questions for whether they, the users, should perform certain financial actions. Further, the systems and methods may provide some initial guidance as to a predicted short-term or long-term impact the action (e.g., the refinanced loan) may have on the user's financial situation or status, among other benefits.

In some embodiments, the systems and methods provide such functionality via two combined and/or integrated agents. For example, a virtual advice platform located at a server and provided by an information services entity (e.g., financial services company) that includes the user as a member may include a conversation agent that facilitates message-based communications over a network between a mobile device associated with a user and the virtual advice platform, and a simulation agent that performs simulations associated with predicting scenarios for the user, such as various financial impact scenarios.

In some cases, the conversation agent receives messages from the mobile device via one or more message communication protocols, sends messages to the mobile device, during one or more chat conversations with the user, and identifies and/or determines questions (or other intent) posed by the user within the messages received from the mobile device.

The simulation agent accesses information associated with the user, performs one or more simulations using the accessed information associated with the user and based on the questions posed by the user, and provides results based on the performed one or more simulations to the conversation agent, which may then provide the results to the user during an ongoing chat conversation.

For example, the systems and methods may receive, via a chatbot of an information services platform located at a server, a message over a communications network from a mobile device associated with a user that is a member of an entity providing the information services platform, determine a question within the message received from the mobile device, access information associated with the user via one or more databases associated with the entity providing the information services platform, perform one or more simulations using the accessed information associated with the user and based on the question within the message, and provide, via the chatbot, a message to the mobile device that includes a result of the performed one or more simulations.

As another example, the systems and methods may identify a question within a message received from the mobile device during a chat conversation between an application of the mobile device and a chatbot provided by the information services platform, access information associated with the user via one or more databases associated with the entity providing the information services platform, perform one or more simulations using the accessed information associated with the user and based on the question identified within the message, and provide, via the chat conversation, a message to the mobile device that includes a result of the performed one or more simulations.

Thus, as described herein, the systems and methods provide users with efficient and timely information about the impact of their purchasing or other financial decisions via combined virtual agents, where the combined virtual agents facilitate conversations and other messaging between the users and the platform managing various financial services and/or accounts for the users, as well as provide the users with dynamically generated results (based on various simulations) to queries posed by the users, such as results that provide insight into how decisions made in the present impact the users in their futures.

For purposes of explanation and illustration, the terms "application" and "application program" are generally synonymous. Further, these terms are applicable to applications running on any kind of device (e.g., a desktop application running on a desktop computer or on a laptop computer). Similarly, a "mobile application" applies to software running on mobile devices. Accordingly, such distinctions will be understood to be clear from the context of usage of the terms "application" or "application program." Additionally, for discussion purposes herein, the terms "entity" and "organization" are considered synonymous. In the discussions presented herein, the term "computer-generated key" or "key" is not limited and will apply to any kind of suitable key generation algorithms, tokenization algorithms, or cryptographic algorithms. Thus, the term "key" can, in some instances, be similar to "tokens." In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of medium/machine-readable medium suitable for storing electronic instructions.

Examples of the Network Environment

As described herein, the systems and methods facilitate various exchanges of information (e.g., messages) between user devices, such as mobile devices, and a virtual assistant, or chatbot, provided by a virtual advice platform running on a server, over a network. FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; a voice-based virtual device (e.g., "Alexa" or "Echo"; and so on). In some embodiments, applications 105A-105N may be stored on one or more computing devices 110A-110M or may be stored remotely on a server (in the "cloud"). These computing devices can include mechanisms for receiving and sending traffic by connecting through network 115 to a virtual advice platform 120 and associated data stores 125 and 130.

Computing devices 110A-110M may be configured to communicate via the network 115 with the virtual advice platform 120. In some embodiments, computing devices 110A-110M can retrieve or submit information to the virtual advice platform 120 and run one or more applications with customized content retrieved by the virtual advice platform 120 and data stores 125 and 130. For example, computing devices 110A-110M can execute a browser application or a customized client to enable interaction between the computing devices 110A-110M, the virtual advice platform 120, and data stores 125 and 130. In some embodiments, the virtual advice platform 120 can be part of a server located remotely from the electronic devices.

The virtual advice platform 120 can be running on one or more servers and can be used to facilitate chat conversations or other messaging between the computing devices 110A-M, the applications 105A-N, and the virtual advice platform 120, and/or perform other activities. For example, the virtual advice platform 120 may receive messages from one or more devices 110A-M, extract, parse, or otherwise obtain a question or other similar intent from within the messages, generate or obtain a simulation result that provides an answer or information to the obtained question, and send, to the devices 110A-M, information representative of the simulation result. Further details regarding the operations of the virtual advice platform 120 are described herein.

Network 115 can be any combination of local area and/or wide area networks, using wired and/or wireless communication systems. Network 115 can be, or could use, any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transfer protocol (HTTP), simple mail transfer protocol (SMTP), and file transfer protocol (FTP). Data exchanged over network 115 may be represented using technologies, languages, and/or formats, including hypertext markup language (HTML) or extensible markup language (XML). In addition, all or some links can be encrypted using conventional encryption technologies such as secure sockets layer (SSL), transport layer security (TLS), and Internet Protocol security (IPsec).

Data stores 125 and 130 can be used to manage storage and access to user data such as user profiles; information relating to goods and services that are of interest to a user; user's financial and personal data; disclosures and compliance information reviewed, acknowledged, or signed by users; data received from third parties; one or more computer-generated keys or computer-generated codes communicated to users for authentication of calling parties involved in simultaneous voice and data communications with multiple parties over multiple electronic media including a variety of electronic devices; and other information. Data stores 125 and 130 may be a data repository of a set of integrated objects that are modeled using classes defined in database schemas. Data stores 125 and 130 may further include flat files that can store data. The virtual advice platform 120 and/or other servers may collect and/or access data from the data stores 125 and 130. Information provided by users can be stored in data stores 125 and 130.

Figure 2:
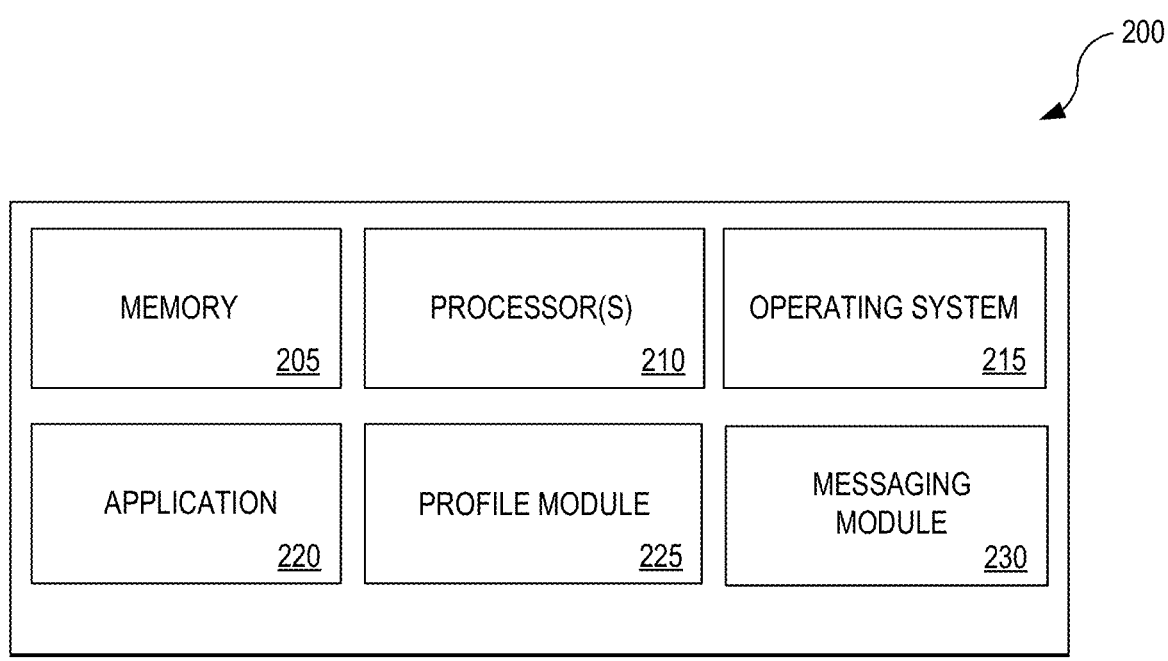
FIG. 2 illustrates various components of a computing device that may be used in accordance with various embodiments of the present disclosure.

FIG. 2 illustrates a set of components 200 within computing device 110 according to one or more embodiments of the present disclosure. The computing devices 110A-110M of user(s) may be used when communicating with the virtual advice platform 120, such as via chat conversations or other messaging protocols or systems. According to the embodiments shown in FIG. 2, the computing device 110 can include memory 205, one or more processors 210, operating system 215, application 220, profile module 225, and messaging module 230. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of operating system 215, application 220, profile module 225, and messaging module 230. Generally, memory 205 can include any device, mechanism, or populated data structure used for storing information. In accordance with some embodiments of the present disclosure, memory 205 can encompass, but is not limited to, any type of volatile memory, nonvolatile memory (RAM), and dynamic memory. For example, memory 205 can be random access memory, memory storage devices, optical memory devices, magnetic media, floppy disks, magnetic tapes, hard drives, single in-line memory modules (SIMMs), synchronous dynamic random access memory (SDRAM), dual in-line memory modules (DIMMs), Rambus dynamic random access memory (RDRAM), double data rate RAM (DDR RAM), small outline DIMMs (SODIMMs), EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with the virtual advice platform 120. For example, application 220 can include an application for financial services, a money transfer application, a social networking application, and/or a gaming application.

Application 220 can access a server and/or a platform associated with an organization (e.g., the virtual advice platform 120) to send communications, receive messages and/or other information associated with results of simulations performed at the platform 120, and so on.

Profile module 225 can maintain personal and financial profiles for a user. Personal data of a user can include a name, an address, a phone number, an email, a unique identification number identifying a user, a photograph of the user, and login credentials such as a username and password for launching an application. Profiles may include users' personal data; bank/financial institution data; loan or other account data; credit card/debit card data, including electronic wallet identification information; details of one or more goods or services that the user is utilizing; credit or financial history information; credit score information; insurance policies that the user has purchased; a collection of cryptographic keys for verifying the authenticity of a remote server associated with the entity offering the goods or services and/or information identifying a third-party verification software that both communicates with profile module 225 and also uses the server-communicated key for verifying the authenticity of the server associated with the entity offering the goods or services. The profile module 225 can query a networked database to retrieve profile information of users. Such profile information can be stored in the "cloud," or it can be physically coupled to profile module 225.

The messaging module 230, in addition to or as part of the application 220, may provide functionality for sending messages (e.g., text or SMS messages, instant messages, chat messages, and so on), between the computing device 110 and the platform 120. In some implementations, messaging module 230 can use a trusted agent to send and receive messages.

Examples of Providing a Simulation-Based Virtual Agent

As described herein, the virtual advice platform 120 may provide various modules for identifying questions, queries, and/or actions to be performed by users within messages sent to the platform 120 (e.g., during a chat conversation), and for running or generating simulation results that identify a possible impact or effect to the users in response to the actions being performed.

Figure 3:
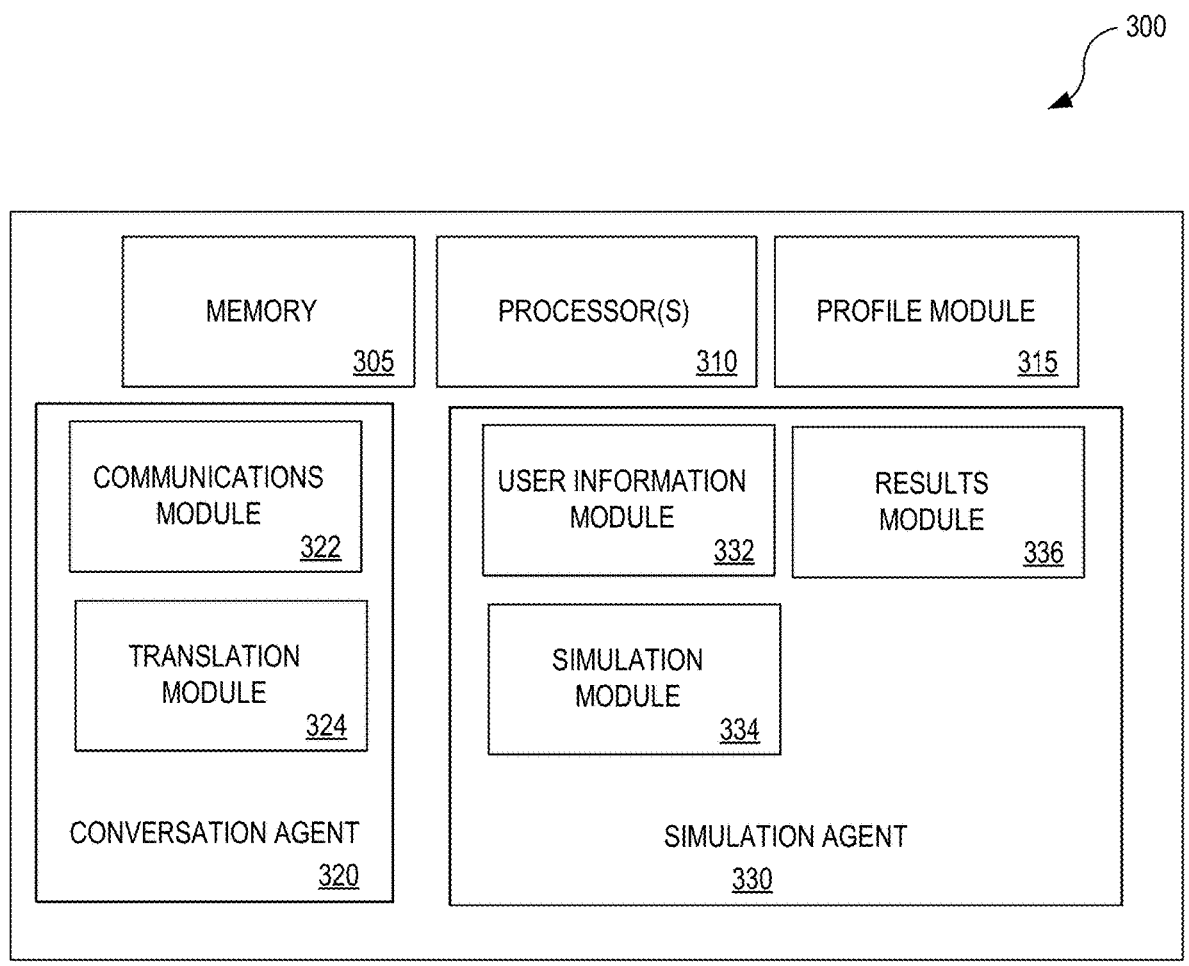
FIG. 3 illustrates various components of a virtual advice platform that may be used in accordance with various embodiments of the present disclosure.

FIG. 3 illustrates a set of components 300 within a system, such the virtual advice platform 120, according to one or more embodiments of the present disclosure. In some embodiments, these components can be included in a server maintained by the entity that owns and operates the virtual advice platform 120. According to the embodiments shown in FIG. 3, the virtual advice platform 120 can include memory 305, one or more processors 310, profile module 315, a conversation agent 320 that includes a communications module 322 and a translation module 324, and a simulation agent 330 that includes a user information module 332, a simulation module 334, and a results module 336.

Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information, as described above for memory 205. Memory 305 can store instructions for running one or more applications or modules on processor(s) 310. For example, memory 305 could be used in one or more embodiments to house all or some of the instructions needed to execute the functionality of the conversation agent 320, the communications module 322, the translation module 324, the simulation agent 330, the user information module 332, the simulation module 334, and/or the results module 336.

Profile module 315 can maintain profiles for users that reflect the personal and financial profiles of the users, similar to the profiles described with respect to profile module 225. In some embodiments, profile module 315 can store a collection of keys and/or session-specific codes that are unique to a user. When a user wants to add a device to the data exchange session or to invite other users to a multi-party conference, one or more keys and/or one or more session-specific codes can be communicated to a user for authenticating a user's device or a remote server depending on the authentication scenario.

The conversation agent 320 facilitates message-based communications over a network between a mobile device associated with a user and a virtual advice platform at a server, which may be provided by an information services entity that includes the user as a member. The conversation agent 320, for example, may be part of a chatbot or other virtual assistant, and may communicate with the user via the application 220 running on the user's device 110.

In some embodiments, the conversation agent 320 facilitates communications via various message communication protocols or systems, including text or SMS message protocols, instant message protocols, online chat protocols, and so on. For example, the virtual advice platform 120 may employ a cloud communications platform, such as Twilio™, which provides the cloud-based communications platform. Conversation agent 320 can use a trusted agent to communicate with the user. For example, conversation agent 320 can receive a request initiated by a user via a client application. The request can include an access token and the details of the request. The access token can be a code or other identifier of the user sent from the client application allowing the client application to access the user's data. The access token can be temporary in its existence but typically stays active until the user changes a password or stops using the client application. Conversation agent 320 can validate the access token via a standard Oauth2.0 specification.

The conversation agent 320 may include various modules, such as the communications module 322, which is configured to receive messages from the mobile device via the one or more message communication protocols and send messages to the mobile device, and the translation module 324, which is configured to determine questions posed by the user within the messages received from the mobile device.

The translation module 324 may utilize various tools to parse, analyze, and extract information from messages, such as questions posed by users, intent of messages, potential actions or events identified by users, and so on. The translation module 324 may apply various natural language processing (NLP) techniques to identify one or more keywords within a message that signify or are part of a question or action posed within the message.

For example, a member of a financial services entity sends a text message to the virtual advice platform with the following text: "Should I spend $25,000 on a new car?" The translation module 324, following various NLP techniques, may scan the message and identify "should," "buy," "car" and "?" as keywords or characters, and determine the user is asking a question regarding the purchase of a car.

The simulation agent 330 may perform simulations associated with predicting scenarios for the user, such as scenarios that identify a predicted impact or effect to a user's future financial situation or status in response to actions performed in the present, such as purchases, changes in saving plans, modifications to current loans, selling or buying of assets, and so on.

In performing simulations, the simulation agent 330 may access various online or local services, such as simulation models built and hosted by AnyLogic, data stored in various databases, such as SQL or other database types described herein, and so on. The simulation agent 330 includes the user information module 332, which is configured to access information associated with the user, the simulation module 334, which is configured to perform one or more simulations using the accessed information associated with the user and based on the questions posed by the user, and the results module 336, which is configured to provide results based on the performed one or more simulations to the conversation agent 320.

For example, if the translation module 324 of the conversation agent 320 identifies a question posed by the user that is associated with a purchase of a good, the simulation module 334 of the simulation agent 330 may perform a simulation that identifies a predicted impact of a future financial status for the user in response to the purchase of the good by the user.

As another example, if the translation module 324 of the conversation agent 320 identifies a question posed by the user that is associated with a change in financial planning for the user, the simulation module 334 of the simulation agent 330 may perform a simulation that identifies a future financial status for the user (e.g., net worth in 5 or 10 years) in response to the action being performed by the user.

The simulation module 334, therefore, may be an agent-based model and can utilize information about the user (e.g., current net worth, total amount of assets, amounts in savings or brokerage accounts, total amount of loans or other debts, current salary or income, and so on), when simulating future results for actions performed today or in the near term.

Figure 4:
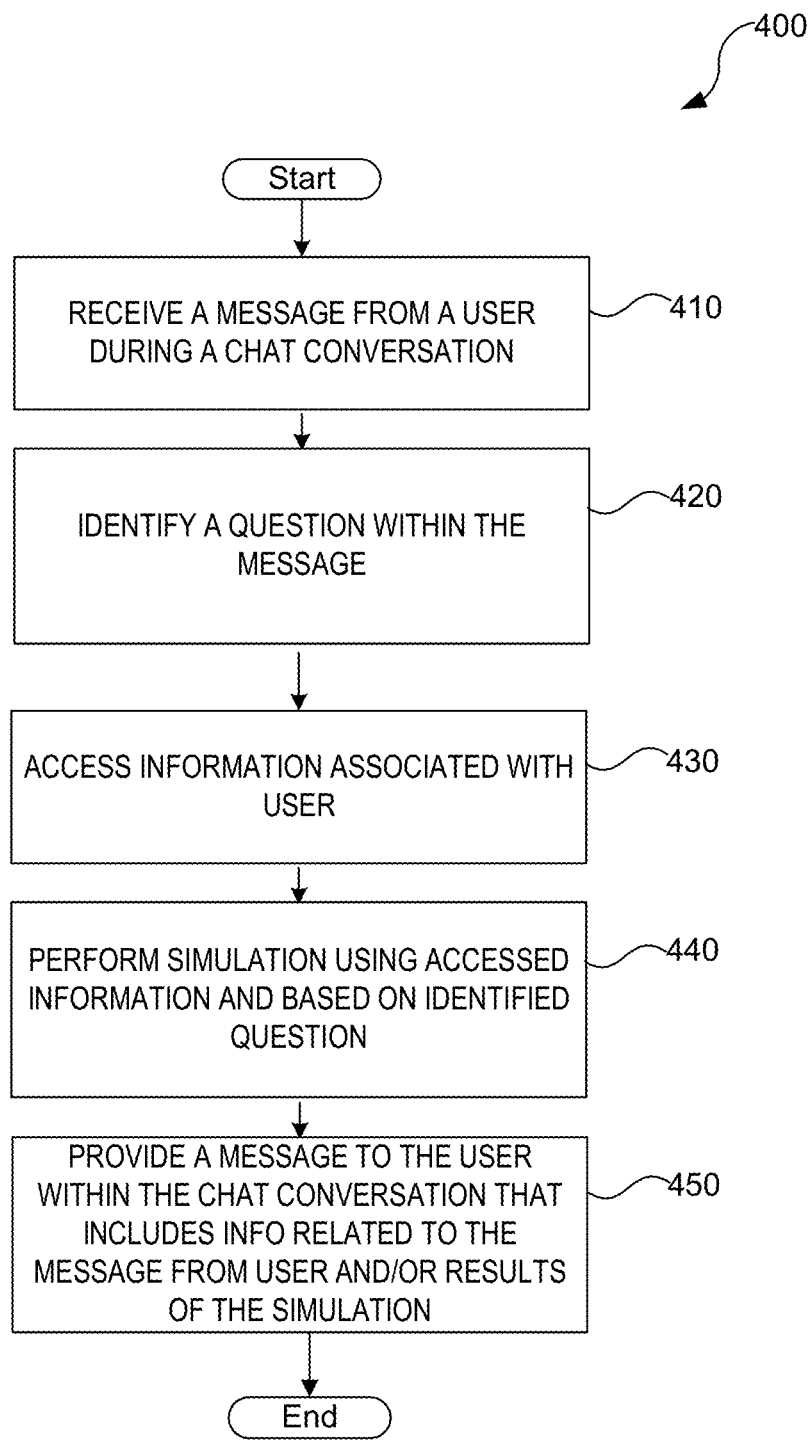
FIG. 4 is a flow diagram illustrating a method of providing simulation-based information to a user during a chat conversation with a virtual assistant.

As described herein, the virtual advice platform 120 and/or various components of the platform 120 may perform operations for providing users with simulation-based results to questions or other actions identified within messages during chat conversations or other communication sessions over a network between the users and virtual assistants associated with the platform 120. FIG. 4 presents a set of such operations. In some embodiments, fewer than all of the operations are performed, whereas in other embodiments additional operations are performed. Moreover, in some embodiments, the operations may be performed in different orders or in parallel. The operations can be performed by various components of computing devices 110 and/or the virtual advice platform 120 such as those illustrated in FIG. 2 and/or FIG. 3.

FIG. 4 is a flow diagram illustrating a method 400 of providing simulation-based information to a user during a chat conversation or other communication session with a virtual assistant or agent. In some embodiments, the method 400 can be performed by a server coupled to the virtual advice platform 120 while in other embodiments, the method 400 can be performed by an application program (e.g., a mobile application or a desktop application) running on a user's computing device.

In operation 410, the virtual advice platform 120 receives, via a chatbot or other virtual assistant of an information services platform (e.g., the virtual advice platform 120) located at a server, a message over a communications network from a mobile device associated with a user that is a member of an entity providing the information services platform. For example, the communications module 322 of the conversation agent 320 may receive messages from the mobile device via the one or more message communication protocols (and, send messages back to the mobile device).

The communications module 322 may utilize various information associated with the mobile device and/or the messages to identify and/or authenticate the user during a messaging session. For example, during an instant message or chat session, the module 322 may initially identify the user via their username, but may also request and obtain user credentials or other identification information, such as biographical information (e.g., full name, phone number, address, and so on), security information (e.g., a security phrase, the last 4 digits of the user's social security number, and so on), answers to security questions, or other information.

As another example, such as during a text message session, the module 322 may initially identify the user via the phone number from which the user is sending messages, and, in some cases, query the user for additional information to authenticate the user to the session.

In operation 420, the platform 120 determines and/or identifies a question within the message received from the mobile device. For example, the translation module 324 of the conversation agent 320 may utilize various tools to parse, analyze, and extract information from messages, such as questions posed by users, intent of messages, potential actions or events identified by users, and so on. In some cases, the translation module 324 may apply various natural language processing (NLP) techniques to identify one or more keywords within a message that signify or are part of a question or action posed within the message.

In operation 430, the platform 120 accesses information associated with the user via one or more databases associated with the entity providing the information services platform. For example, the user information module 332 of the simulation agent 330 may access information associated with the user from one or more of the data stores 125 and/or 130.

As described herein, the module 332 may obtain information from a variety of different accounts or services managed and/or provided by an entity, such as a financial services entity, providing the platform 120. Example information includes biographical information and financial history information (e.g., spending habits, credit score, loan payment history, savings rate, and so on) associated with the user, and/or information from one or more loan accounts provided to the user by the entity providing the information services platform and/or one or more bank accounts provided to the user by the entity providing the platform 120.

In operation 440, the platform 120 performs one or more simulations using the accessed information associated with the user and based on the question within the message. For example, the simulation module 334 of the simulation agent 330 may perform one or more simulations using the accessed information associated with the user and based on the questions posed by the user.

As described herein, the simulation module 334 may perform simulations to identify and/or predict a future impact associated with a current or present action performed by the user (e.g., simulating how the user's future net worth change should the user buy a car at a certain price today), simulations to identify and/or predict a future impact associated with a current or present modification to the user's financial planning (e.g., simulating how the user's total assets change over time should the user adjust their 401k or savings contributions), and so on.

Of course, the platform 120 may generate simulation results for a variety of different posed questions or potential actions or events associated with a user. Some examples include:

The platform 120 may determine a future impact to the user's financial status in response to a question of "What happens if I get into a car accident with my current coverage?" or "What is the best coverage in case I get into a car accident in the next year?";

The platform 120 may determine a future impact to the user's net worth in response to a question of "How does a purchase of a $25,000 car impact me?" or "What is a reasonable price for car given my situation?";

The platform 120 may determine a future impact to the user's work life in response to a question of "When can I retire given my current rate of savings?" or "What do I need to do to retire in 5 or 10 years?"; and so on.

In operation 450, the platform 120 provides, via the chatbot or virtual assistant, a message to the mobile device. The content of the message to the user can include guidance or advice about the subject matter of the user's initial message. The content of the message to the user can further include a result of the performed one or more simulations. For example, the results module 336 of the simulation agent 330 may provide the results based on the performed one or more simulations to the conversation agent 320, such as by providing an answer to the question based on the result or results of the performed one or more simulations.

Figure 5:
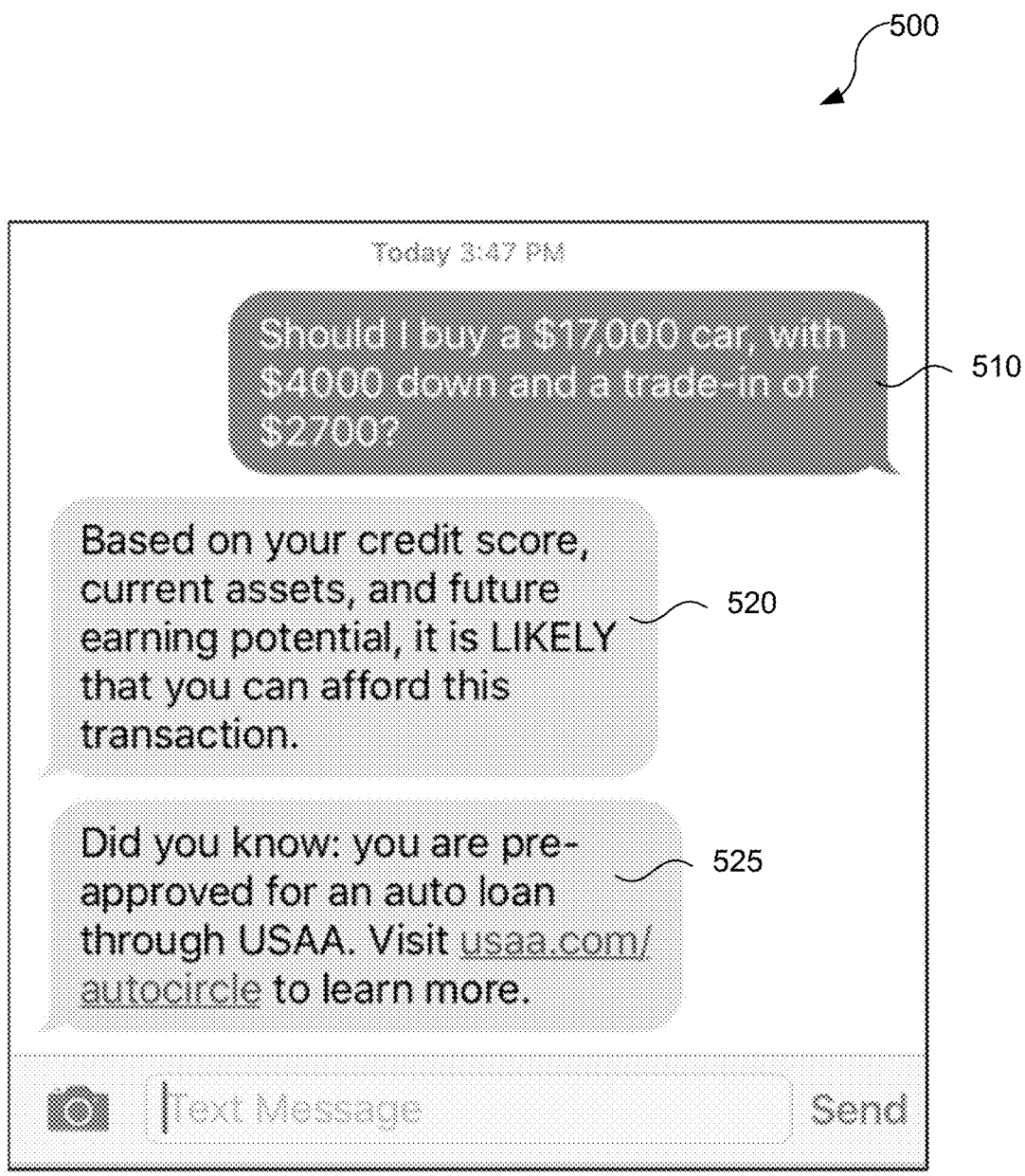
FIG. 5 is a display diagram illustrating an example messaging session between a user and a virtual assistant.

FIG. 5 is a display diagram illustrating an example messaging session 500 between a user and a virtual assistant. As depicted, the messaging session 500 includes an initial message 510 sent from a user at a mobile device to a virtual assistant associated with a financial services entity. Via the systems and methods described herein, the virtual advice platform 120 receives the message 510 and determines the message includes a question of whether the user should buy a car, given certain purchase parameters (e.g., price, down payment, trade in value, and so on).

The platform 120 obtains information associated with the user (e.g., current assets and account information, loan information, and so on), and performs a simulation to determine the potential car purchase's impact on the user's short term and long term financial situation or status. The platform 120 then generates and sends a return message 520 that displays information representing one or more results of the simulation, such as an indication that the user can "likely" afford the transaction (e.g., the user's financial status may not be impacted). Further, the platform 120 may provide the user with other complementary information 525, such as information and/or links to financial services provided by the entity (e.g., car loans) and associated with the requested actions.

To further illustrate the flow of communications between users and the platform 120, FIGS. 6A-6D depict an example exchange of messages 600 between a user and a virtual assistant during a messaging session. For example, a user is interested in buying a car, and contacts the platform 120 obtain advice in near real-time and specific to his/her current financial situation.

Figure 6A:
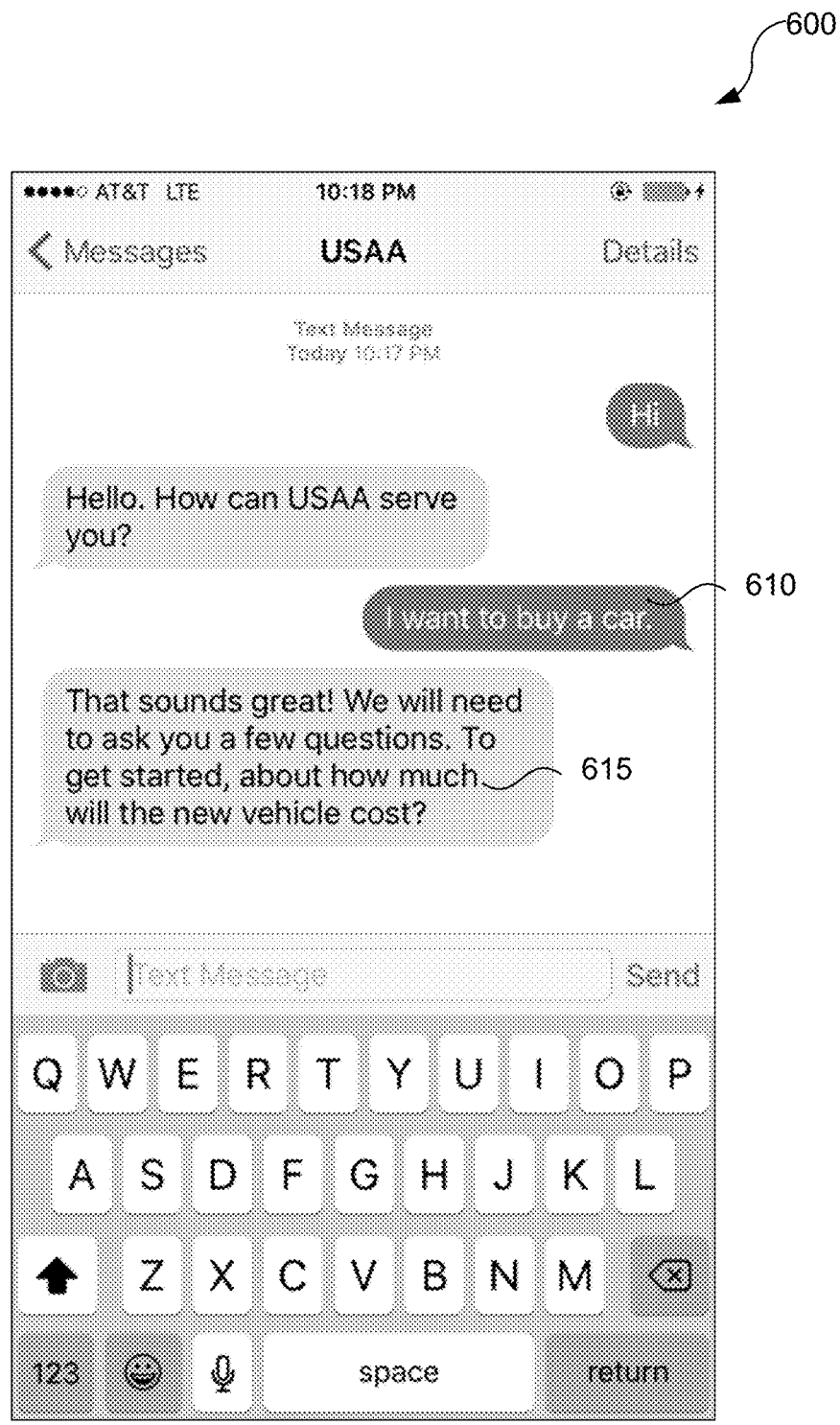
FIGS. 6A-6D are display diagrams illustrating an example exchange of messages between a user and a virtual assistant during a chat conversation.

As shown in FIG. 6A, the user sends a message 610 to the virtual assistant of "I want to buy a car." The platform 120 determines the message 610 includes a question about buying a car and responds, via one or more modules of the conversation agent 320, with an initial return message 615 to obtain some information from the user, such as the purchase price of the car.

Figure 6B:
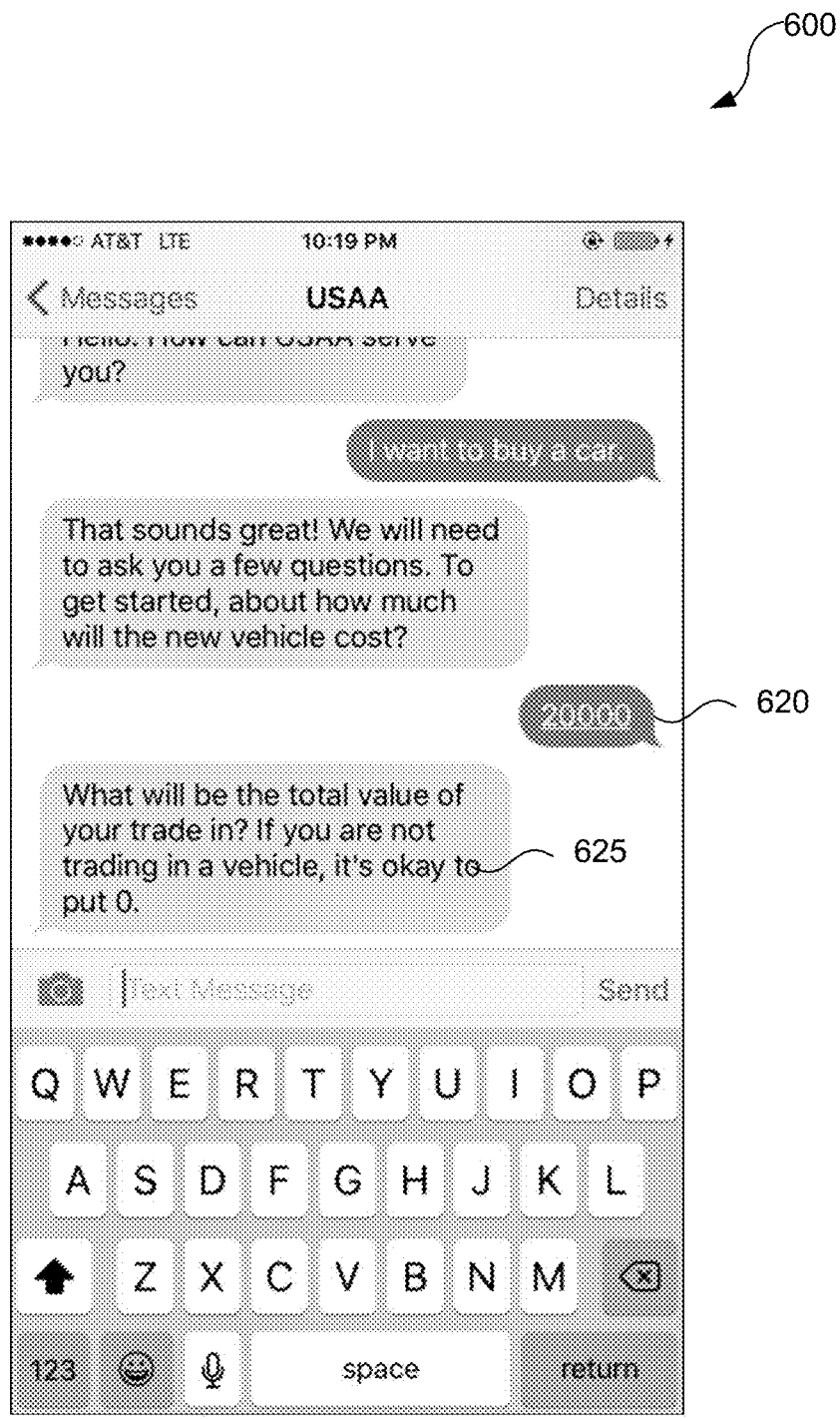
Figure 6C:
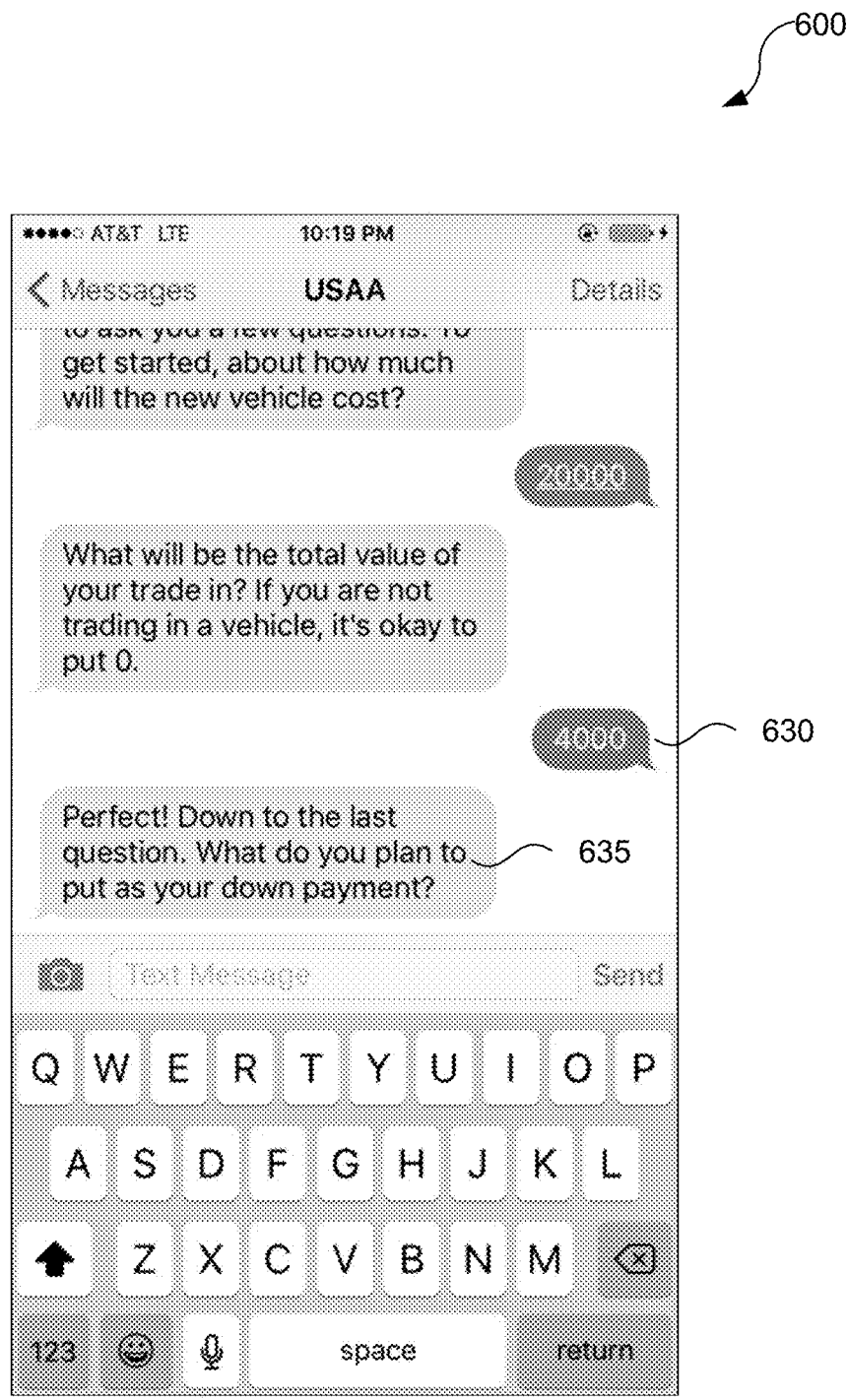
Figure 6D:
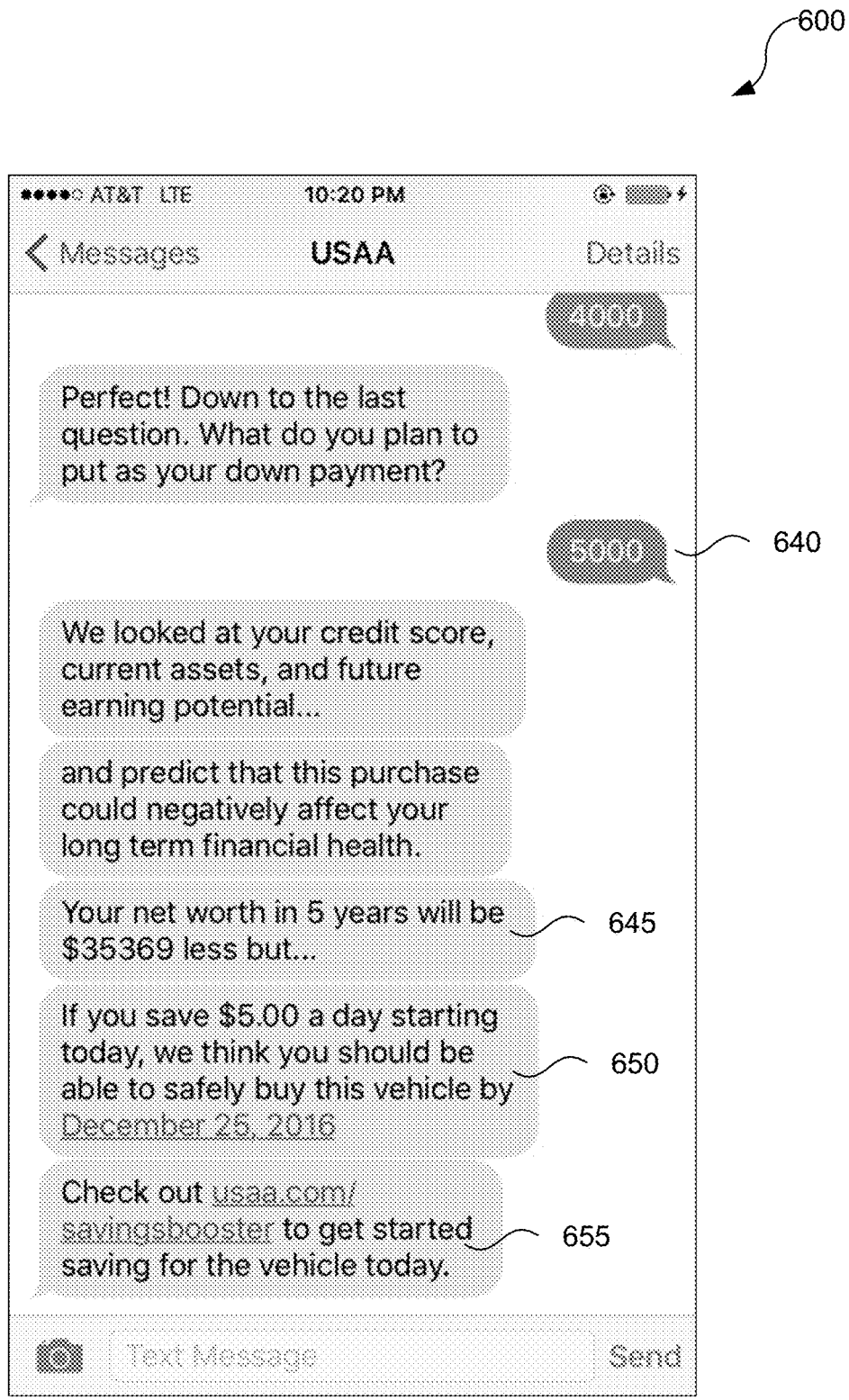

Continuing to FIG. 6B, the user responds with a message 620 indicating the purchase price (e.g., "$20,000'). and the virtual assistant responds with an additional query 625 for more information, such as the trade in value of the user's current vehicle. In FIG. 6C, the user sends a message 630 providing the information (e.g., "$4,000'), and the virtual assistant requests 635 some more information (e.g., down payment information).

In FIG. 4D, the user provides a message 640 with the request information (e.g., "$5,000). Using the information obtaining during the messaging session (e.g., via messages 610-640), the platform 120 obtains financial information for the user, performs one or more simulations as described herein, and determines a result associated with how the requested car purchase will impact the user's long term financial status.

As shown in FIG. 4D, the platform 120 sends a message 645 that presents the results of the simulation (e.g., the user's net worth in 5 years will decrease), as well as a message 650 that provides a saving recommendation to the user, and a message 655 that identifies tools provided by the platform 120 to assist the user in saving for the purchase. Of course, the platform 120 may provide other information.

Thus, in some embodiments, the systems and methods provides virtual advice to users by identifying a question within a message received during a chat or messaging conversation between an application of a user device and a virtual assistant provided by an information services platform or other virtual advice platform, access information associated with the users via one or more databases associated with the entity providing the information services platform, perform one or more simulations using the accessed information associated with the user and based on the question identified within the message, and provide, via the conversation, a message to the user that includes a result of the performed one or more simulations.

In some embodiments, therefore, the systems and methods combine the functionality of virtual assistants with simulation agents to provide members, customers, and/or users of entities, such as financial services entities, with targeted predictions of the future impact of actions or other events (e.g., large purchases) performed by users in the present day. Thus, the systems and methods may enhance the functionality of virtual assistants and other similar computing applications, among other benefits.

Computer System Overview

Figure 7:
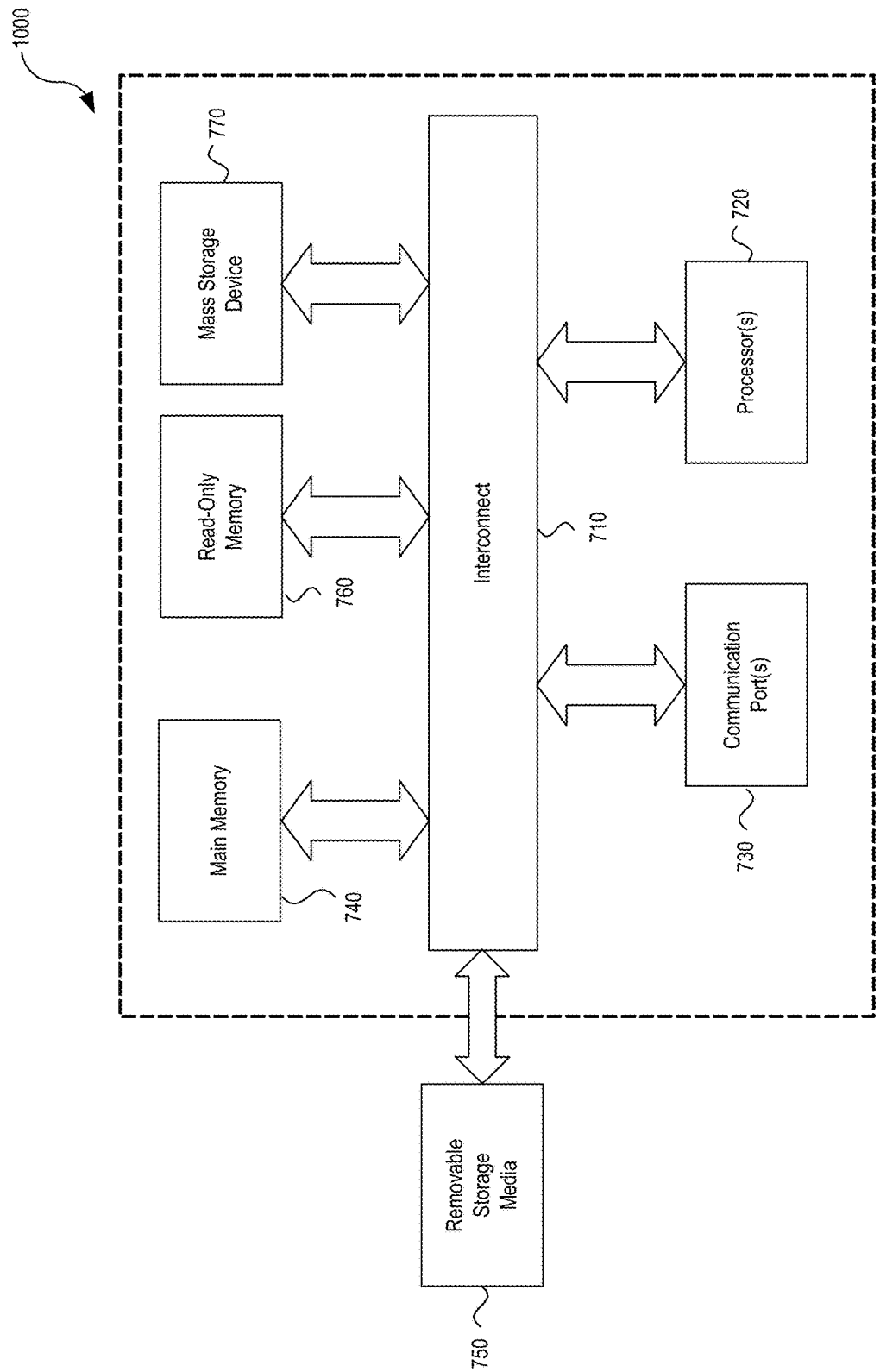
FIG. 7 illustrates an example of a computer system with which some embodiments of the present disclosure may be utilized.

Embodiments of the present disclosure include various steps and operations, which have been described above. A variety of these steps and operations may be performed by hardware components or they may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system includes an interconnect 710, at least one processor 720, at least one communication port 730, a main memory 740, a removable storage media 750, a read-only memory 760, and a mass storage device 770.

Processor(s) 720 can be any known processor, such as, but not limited to, an Intel® Itanium® or Itanium 2® processor(s), or AMD® Opteron® or Athlon MP® processor(s), or Motorola® lines of processors. Communication port(s) 730 can be any of an RS-232 port for use with a modem-based dialup connection, a 10/100 Ethernet port, or a Gigabit port using copper or fiber. Communication port(s) 730 may be chosen, depending on a network such a Local Area Network (LAN), Wide Area Network (WAN), or any network to which the computer system 700 connects.

Main memory 740 can be random access memory (RAM) or any other dynamic storage device(s) commonly known in the art. Read-only memory 760 can be any static storage device(s), such as programmable read-only memory (PROM) chips for storing static information, such as instructions for processor(s) 720.

Mass storage device 770 can be used to store information and instructions. For example, hard disks such as the Adaptec® family of SCSI drives, an optical disc, an array of disks such as RAID, the Adaptec family of RAID drives, or any other mass storage devices may be used.

Interconnect 710 communicatively couples processor(s) 720 with the other memory, storage, and communication blocks. Interconnect 710 can be a PCI/PCI-X- or SCSI-based system bus, depending on the storage devices used.

Removable storage media 750 can be any kind of external hard-drives, floppy drives, USB drives, IOMEGA® Zip Drives, compact disc-read-only memory (CD-ROM), compact disc-re-writable (CD-RW), or digital video disc-read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for authentication of calling parties for simultaneous voice and data communications with multiple parties over multiple electronic mediums including a variety of electronic devices. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method of facilitating communications over a network between a device associated with a user and a virtual advice platform provided by an information services entity, the method comprising:
   receiving, from the device, at least one question, posed by the user and related to a financial purchase;
   performing at least one simulation associated with predicting scenarios for the at least one question related to the financial purchase, wherein the performing the at least one simulation includes:
      accessing user information from at least one loan account or at least one bank account associated with the user by the information services entity;
      identifying a predicted impact, of a total amount of debt for the user in response to the financial purchase, using the accessed user information from the at least one loan account or the at least one bank account; and
      identifying a net worth for the user in response to the financial purchase; and
   sending a message to the device that includes information representing a result of the at least one simulation, wherein the message includes a recommendation of whether the user should make the financial purchase including:
      in response to the recommendation being to make the financial purchase, providing a first simulation result with the predicted impact on a long-term financial status of the user, and
      in response to the recommendation being to not make the financial purchase, providing a second simulation result with a negative predicted impact on the long-term financial status of the user and an alternative plan,
         wherein the alternative plan includes an alternative recommendation for the user to make the financial purchase at a later date, and at least one predicted impact on the long-term financial status of the user based on making the financial purchase at the later date; and
   identifying a second question posed by the user that is associated with a change in financial planning for the user to make the financial purchase.

2. The method of claim 1, The method of claim 1, further comprising:
   identifying, via a natural language processing operation, at least one keyword within the at least one question that is associated with the financial purchase.

3. The method of claim 1, further comprising:
   providing a virtual assistant accessible to the device via an application running on the device that is provided by the information services entity.

4. The method of claim 1, wherein the information services entity is a financial services entity that provides at least one financial account to the user.

5. The method of claim 1, wherein the information services entity is an online personal services entity that aggregates information from at least one financial account associated with the user.

6. A non-transitory computer-readable medium storing instructions that, when executed by a computing system, cause the computing system to perform operations for facilitating communications over a network between a device associated with a user and a virtual advice platform provided by an information services entity, the operations comprising:

receiving, from the device, at least one question, posed by the user and related to a financial purchase;

performing at least one simulation associated with predicting scenarios for the at least one question related to the financial purchase, wherein the performing the at least one simulation includes:

accessing user information from at least one loan account or at least one bank account associated with the user by the information services entity;

identifying a predicted impact, of a total amount of debt for the user in response to the financial purchase, using the accessed user information from the at least one loan account or the at least one bank account; and identifying a net worth for the user in response to the financial purchase; and sending a message to the device that includes information representing a result of the at least one simulation, wherein the message includes a recommendation of whether the user should make the financial purchase including:

in response to the recommendation being to make the financial purchase, providing a first simulation result with the predicted impact on a long-term financial status of the user, and in response to the recommendation being to not make the financial purchase, providing a second simulation result with a negative predicted impact on the long-term financial status of the user and an alternative plan, wherein the alternative plan includes an alternative recommendation for the user to make the financial purchase at a later date, and at least one predicted impact on the long-term financial status of the user based on making the financial purchase at the later date; and identifying a second question posed by the user that is associated with a change in financial planning for the user to make the financial purchase.

7. The non-transitory computer-readable medium of claim 6, wherein the operations further comprise:

identifying, via a natural language processing operation, at least one keyword within the at least one question that is associated with the financial purchase.

8. The non-transitory computer-readable medium of claim 6, wherein the operations further comprise:

providing a virtual assistant accessible to the device via an application running on the device that is provided by the information services entity.

9. The non-transitory computer-readable medium of claim 6, wherein the information services entity is a financial services entity that provides at least one financial account to the user.

10. The non-transitory computer-readable medium of claim 6, wherein the information services entity is an online personal services entity that aggregates information from at least one financial account associated with the user.

11. A system comprising:
one or more processors; and
one or more memories storing instructions that, when executed by the one or more processors, cause the system to perform a process of facilitating communications over a network between a device associated with a user and a virtual advice platform provided by an information services entity, the process comprising:

receiving, from the device, at least one question, posed by the user and related to a financial purchase;

performing at least one simulation associated with predicting scenarios for the at least one question related to the financial purchase, wherein the performing the at least one simulation includes:

accessing user information from at least one loan account or at least one bank account associated with the user by the information services entity;

identifying a predicted impact, of a total amount of debt for the user in response to the financial purchase, using the accessed user information from the at least one loan account or the at least one bank account; and identifying a net worth for the user in response to the financial purchase; and sending a message to the device that includes information representing a result of the at least one simulation, wherein the message includes a recommendation of whether the user should make the financial purchase including:

in response to the recommendation being to make the financial purchase, providing a first simulation result with the predicted impact on a long-term financial status of the user, and in response to the recommendation being to not make the financial purchase, providing a second simulation result with a negative predicted impact on the long-term financial status of the user and an alternative plan, wherein the alternative plan includes an alternative recommendation for the user to make the financial purchase at a later date, and at least one predicted impact on the long-term financial status of the user based on making the financial purchase at the later date; and identifying a second question posed by the user that is associated with a change in financial planning for the user to make the financial purchase.

12. The system according to claim 11, wherein the process further comprises:

identifying, via a natural language processing operation, at least one keyword within the at least one question that is associated with the financial purchase.

13. The system according to claim 11, wherein the process further comprises:

providing a virtual assistant accessible to the device via an application running on the device that is provided by the information services entity.

14. The system according to claim 11,
wherein the information services entity is a financial services entity that provides at least one financial account to the user, and
wherein the information services entity is an online personal services entity that aggregates information from at least the one financial account associated with the user.

* * * * *